No. 679,773. Patented Aug. 6, 1901.
J. L. McDOWELL.
SPRING MOTOR VEHICLE.
(Application filed Apr. 18, 1901.)
(No Model.)

Witnesses
Inventor
James L. McDowell
Emil Starek
By his Attorney

THE NORRIS PETERS CO., PHOTO-LITHO., WASHINGTON, D. C.

UNITED STATES PATENT OFFICE.

JAMES L. McDOWELL, OF ST. LOUIS, MISSOURI, ASSIGNOR OF ONE-HALF TO CHARLES H. DODGE, OF SAME PLACE.

SPRING-MOTOR VEHICLE.

SPECIFICATION forming part of Letters Patent No. 679,773, dated August 6, 1901.

Application filed April 18, 1901. Serial No. 56,454. (No model.)

*To all whom it may concern:*

Be it known that I, JAMES L. MCDOWELL, a citizen of the United States, residing at St. Louis, State of Missouri, have invented certain new and useful Improvements in Spring-Motor Vehicles, of which the following is a full, clear, and exact description, reference being had to the accompanying drawings, forming a part hereof.

My invention has relation to improvements in spring-motor vehicles; and it consists in the novel arrangement and combination of parts more fully set forth in the specification and pointed out in the claims.

Figure 1:
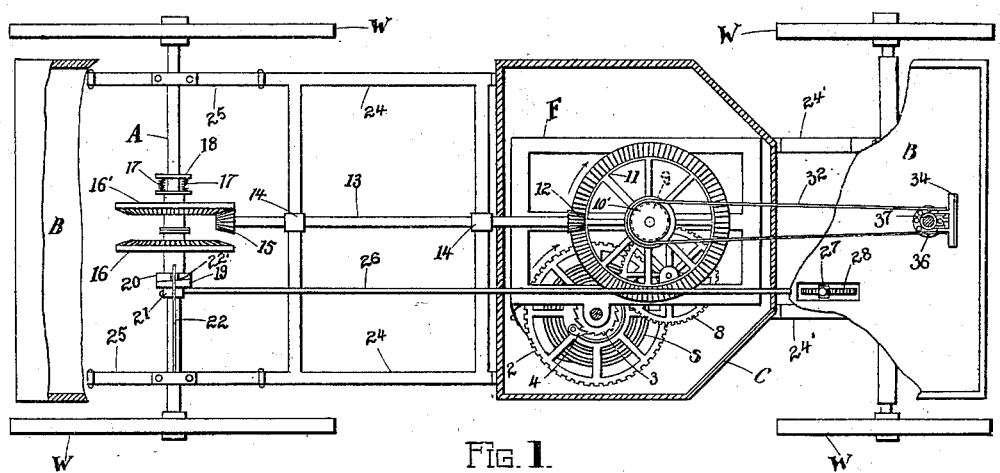
Figure 2:
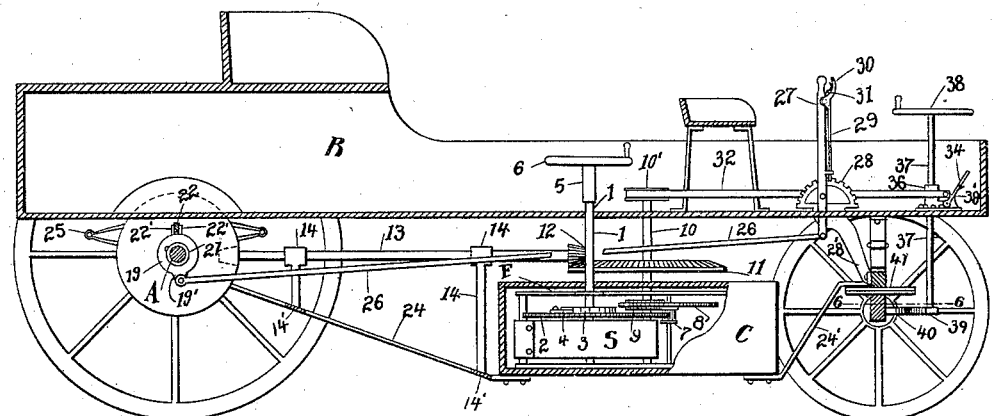
Figures 4, 5:
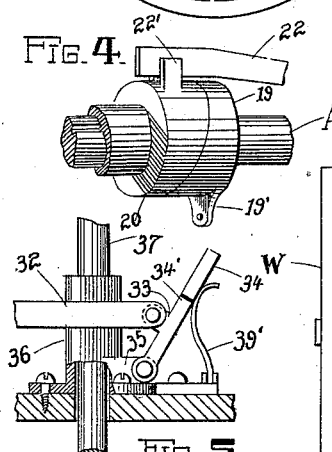
Figure 3:
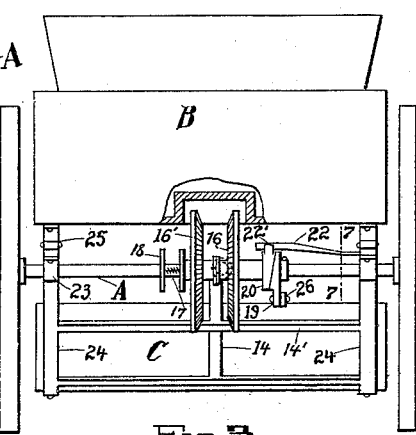
Figures 6, 7:
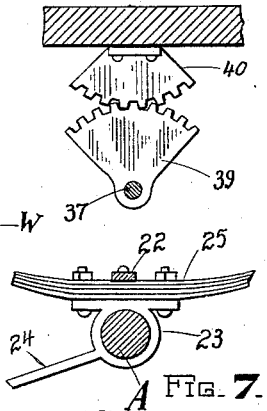

In the drawings, Figure 1 is a top plan of the driving mechanism, the wagon-body being removed. Fig. 2 is a side elevation, the wagon-body being in longitudinal section. Fig. 3 is a rear elevation. Fig. 4 is a perspective detail of the shifting reversing disks. Fig. 5 is a side elevation showing enlarged detail of the steering-staff and brake lever and band. Fig. 6 is a sectional detail on line 6 6 of Fig. 2, and Fig. 7 is a sectional detail on line 7 7 of Fig. 3.

The object of my invention is to construct a spring-motor vehicle which will possess all the advantages of the prevailing automobile—one which is readily reversible, under perfect control of the operator, one which is light, inexpensive, and durable, and one possessing further and other advantages better apparent from a detailed description of the invention, which is as follows:

Referring to the drawings, A represents the rear rotatable axle or shaft of the vehicle, and B the wagon-body. Below the latter is mounted a box or casing C, which houses the spring driving mechanism, the latter comprising a rotatable spindle 1, to which is secured the inner end of the winding-spring S, whose outer end is secured to a stationary member of the frame F, by which the driving parts are directly carried.

Loosely mounted about the spindle 1 is the main gear-wheel 2, above which is secured to the spindle a ratchet-wheel 3, with which the spring-pawl 4 engages, the latter being pivotally secured to the gear-wheel 2. The spindle is turned for purposes of winding the spring S in a direction contrary to that of the arrows indicated in Fig. 1, the winding being accomplished by a key or socket 5, provided with a hand-wheel 6, the same as any ordinary clock mechanism, the spring driving the train of wheels, as indicated by arrows in Fig. 1. The teeth of the gear-wheel 2 engage a spur-pinion 7, mounted on the spindle of a second gear-wheel 8, which latter engages a gear-wheel 9, mounted on the vertical shaft 10, to which is secured directly above the casing C and below the carriage-body B a bevel gear-wheel 11. The latter meshes with a pinion 12 at one end of a horizontal shaft 13, mounted in bearings or standards 14 of a frame 14', secured to the casing C and front and rear trucks, respectively, the opposite or rear end of the shaft 13 carrying a pinion 15, which meshes with either one of two vertically-mounted bevel gear-wheels 16 16', according to the direction of travel to be imparted to the vehicle. The hub portions of the wheels 16 16' are coupled together, the two wheels being feathered to the shaft A to move longitudinally thereon and rotate simultaneously therewith. When the pinion 15 engages the gear-wheel 16', the wagon will run backward, as is obvious from Fig. 1. To cause same to travel forward, the wheel 16' is disengaged from the said pinion, and the latter is made to engage the gear-wheel 16 (see Fig. 3) by the following mechanism:

As just stated, the gear-wheels 16 16' are feathered to the shaft A and movable along the same, the gear 16' being forced into engagement with pinion 15 by the springs 17, interposed between the hub of the wheel 16' and a disk 18, keyed to the shaft A adjacent to said hub. Rotatable loosely about the shaft A on the opposite side of the gears 16 16' is a disk 19, having an inclined face rubbing against a corresponding face of a second disk 20, also loosely mounted on the shaft and bearing against the hub of wheel 16, the two disks being interposed between said hub and a collar 21, keyed to the shaft A. Upon rotation of the disk 19 in the proper direction it is apparent that by reason of the inclined faces referred to the inner disk 20 will be forced against the hub of the wheel 16, thus forcing the wheel 16' out of engagement with the pinion 15 and forcing wheel 16 into engagement therewith, when the vehicle will run in the opposite direction. To prevent rotation of the disk 20 under the circumstances just referred to and to insure only a longitudinal movement of the same against the wheel 16, I provide the periphery of the disk 20 with lugs 22', between which passes the free end of a rigid guide-arm 22, projecting from and secured to one of the loops or shaft-bearings 23 at the end of the truss-bars 24, forming a part of the frame 14', secured to the casing C, the opposite end of the casing being coupled to the front truck at a point above the fifth-wheel through the bars 24. The loops 23 likewise serve as means for securing thereto the rear wagon-springs 25.

The mechanism for rotating the reversing disk 19 consists of a connecting-rod 26, pivotally coupled at one end to the arm 19', forming an integral part of disk 19, the opposite end of said rod being connected to the lower and short arm of the reversing-lever 27, projecting through the wagon and pivotally mounted to a toothed plate 28, mounted on a bracket 28', which is carried by the framework beneath the wagon-body. By tilting the lever 27 in the proper direction a corresponding rocking motion will be imparted to the disk 19, as is obvious. The lever 27 when once in proper position for effecting the engagement referred to is locked by the pawl-arm 29 engaging the teeth of the plate 28, said pawl being actuated by a pivoted trigger 30, controlled in one direction by a spring 31.

To stop the rotation of the driving-gearing at any moment, I provide the upper end of the vertical shaft 10 with a pulley or disk 10', about which passes a brake-band 32, whose ends are secured to lugs 33 of the pivotal arms 34' of the brake-lever 34, the said arms being pivoted to lugs 35, forming an integral part of the casting 36, which constitutes the main bearing for the steering-staff 37, (operated by a hand-wheel 38,) whose lower end carries a toothed arc 39, meshing with a corresponding arc 40 of the front truck at a point below the fifth-wheel 41. The band 32 is normally kept from frictional engagement with the disk 10' by a spring 39', which has a tendency to keep the brake-lever 34 in a raised position. In the operation of the device the driver may straddle the rod 37, placing one foot against the lever 34, on either side of said steering-rod, and by pressing his feet forcibly against the brake-lever can depress the same against the resilience of the spring 39' and cause the band to hug the disk 10', thus stopping the rotation of the driving mechanism.

It is of course apparent that the lever 27 may be tilted to an intermediate position, whereby both gear-wheels 16 16' will be disengaged from the pinion 15.

It will be seen from the foregoing that the several parts are so arranged as to be all within easy reach of the operator or driver, and the vehicle is under perfect control.

I do not of course limit myself to the details herein set forth, as these may, in a measure, be changed without departing from the spirit of my invention.

Having described my invention, what I claim is—

1. In a spring-motor vehicle, a rotatable axle, a pair of gear-wheels feathered to the same and movable longitudinally thereon, a spring-actuated pinion rotating in one direction adapted to mesh with one or the other of said gear-wheels, springs for effecting engagement with one of said gear-wheels and the pinion, a reversing disk rotatable about the axle, a longitudinally-movable disk mounted on the axle and actuated in one direction by the rotation of the reversing disk, means for guiding said longitudinally-moving disk and preventing rotation of the same about the axle during such longitudinal movement, and means under the control of the operator for actuating the reversing disk, substantially as set forth.

2. In a spring-motor vehicle, a rotatable axle, a pair of gear-wheels feathered to the same and movable longitudinally thereon, a disk fixed to the axle on one side of the gear-wheels, springs interposed between said disk and the hub of the adjacent gear-wheel, a disk mounted loosely on the axle on the opposite side of the gear-wheels, lugs formed on the peripheral walls of said last disk, a rigid arm passing between said lugs to insure longitudinal movement for said disk along the axle, a rotatable disk having an inclined face mounted on the axle, and engaging the longitudinally-movable disk along a similar inclined face, a collar fixed to the axle on the opposite side of the rotatable disk, and means under the control of the operator for rocking the rotatable disk, the parts operating substantially as, and for the purpose set forth.

3. In a spring-motor vehicle, a gear mechanism having a main or vertical rotatable shaft forming a part thereof, and projecting through the floor of the wagon-body, a pulley or disk at the upper end of said vertical shaft, a brake-band passing around said disk, a brake-lever, a casting having lugs formed integrally therewith, arms forming a part of the brake-lever and pivoted to said lugs, the ends of the brake-band being secured to the arms of the brake-lever, and a spring for normally forcing the brake-lever, to a position for effecting frictional disengagement between the brake-band and vertical shaft, substantially as set forth.

4. In a spring-motor vehicle, a rotatable reversing disk mounted on the rear axle of the vehicle, a connecting-rod extending forward from said disk, a reversing-lever pivoted in the forward part of the vehicle, a spring-actuated pawl carried by the lever, a toothed plate for engaging the pawl, gear-wheels feathered to the axle, a second disk located adjacent to the rotatable disk, said second disk being longitudinally movable along the axle, the contacting surfaces between the disks being inclined to the plane of rotation of the reversing disk, and springs on the opposite side of the gear-wheels for shifting the latter back to their normal position, the parts operating substantially as, and for the purpose set forth.

In testimony whereof I affix my signature in presence of two witnesses.

JAMES L. McDOWELL.

Witnesses:
 EMIL STAREK,
 C. H. DODGE.